(No Model.)

A. FRENCH.
Thill Coupling.

No. 237,510.  Patented Feb. 8, 1881.

Witnesses:
Franck L. Ouraud
Alex Scott

Albert French, Inventor.
by John J. Halsted.
his Att'y

UNITED STATES PATENT OFFICE.

ALBERT FRENCH, OF CLEVELAND, OHIO, ASSIGNOR OF ONE-HALF TO ALFRED FRENCH, OF WASHINGTON, DISTRICT OF COLUMBIA.

THILL-COUPLING.

SPECIFICATION forming part of Letters Patent No. 237,510, dated February 8, 1881.

Application filed November 19, 1880. (No model.)

*To all whom it may concern:*

Be it known that I, ALBERT FRENCH, of Cleveland, in the county of Cuyahoga and State of Ohio, have invented certain new and useful Improvements in Thill-Couplings; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvements relate to the clip-bar, and to a construction of device for the prevention of rattling, both being applicable to thill-couplings of otherwise ordinary construction, the construction of the improvements being also such that when applied the forward clip-nut serves to lock to place the nut which holds the anti-rattler tightening-bolt.

The invention consists in providing the clip-bar with either an integral or a separate forward projection having a slot or opening at its forward end to receive a bolt, which serves to retain and tighten a rubber or elastic wedge-like-shaped plug, and to press it against the thill-iron; and it further consists in combining with such bolt having a square or other head, by which it may be turned by means of an ordinary wrench, a wedge-like rubber or equivalent elastic plug, through which the bolt passes, the bolt being provided with a nut at its extremity, whereby, when the bolt is turned therein, the plug may be tightened to any desired degree in the space between the thill-iron and the clip, and in other features hereinafter more particularly set forth and claimed.

Figure 1:
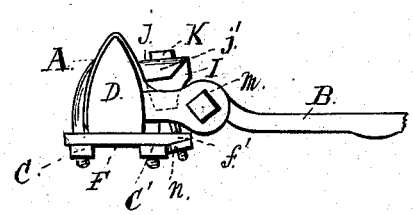
Figure 2:
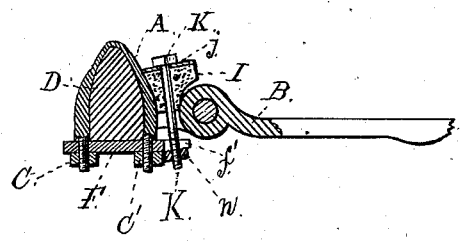
Figure 3:
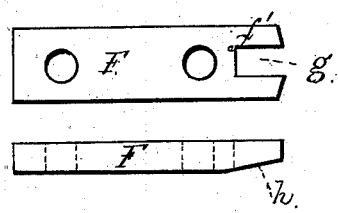
Figure 4:
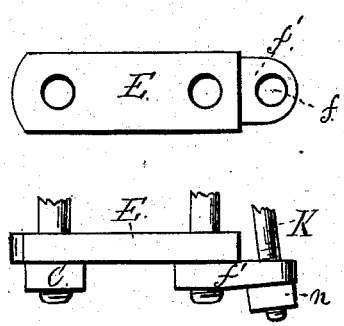
Figure 5:
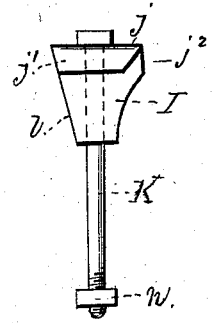

Figure 1 is an elevation, on a reduced scale, of a thill-coupling with my improvements applied thereto; Fig. 2, a vertical section of the same; Fig. 3, a plan and an edge view of my improved clip-bar when made all in one piece; Fig. 4, a plan and edge view of the same when made in two pieces, and Fig. 5 the rubber plug with its cap, bolt, and nut.

A represents an ordinary clip, connected to an ordinary thill-iron, B, by a bolt and nut in a well-known manner, and C C' the customary nuts which secure the clip to an axle, D.

Instead of the ordinary clip-bar, such as is shown at E, Fig. 4, I employ one of peculiar construction, as shown at F, having its forward end, $f'$, extending considerably beyond the forward nut, C', such forward end having a slot or a slit, $g$, as shown, and also having, by preference, a slight incline or bevel, $h$, on the under side of this forward end, for purposes presently to be described.

I is a rubber plug, adapted in form at its lower portion to enter and substantially to occupy the space between the rear or eye portion of the thill-iron and the front part of the clip. The upper part of this plug is large enough to admit of its front arched or concave face being forced into close contact with the rounded end of the thill-iron, and to admit of its being forced farther and farther in as the rubber may wear, and still make a close enough fit to prevent rattling. The plug, which may be of other material, though I deem rubber the best, is provided with a metal cap-piece, $j$, which serves to protect the plug from the weather, and also serves as a washer between the plug and the head of a bolt, K, which passes through the washer and through the plug, and through the opening or slot $g$ of the clip-bar C. This cap-piece has flanges at its two opposite sides, as shown at $j'$, and these flanges are cut away at an incline at their front edges, as shown at $j^2$. The flanges prevent or check the lateral expansion of the rubber, but offer no obstacle to its expansion (when compressed) in a forward direction, so as to impinge against the thill-iron. The inclines prevent the cap from coming in contact with the thill-iron. I prefer to make the rear of the plug somewhat inclined rearward from its bottom, as shown at $l$, the better to adapt it to existing clips, and thus make a snug-fit—clips usually having a curvature, incline, or swell from their top to their junction with the ears $m$, to which the thill-iron is connected. This inclination of the clip tends to throw the lower and threaded end of the bolt K slightly forward, and this affords room for the nut $n$ of this bolt to be placed just forward of the clip-nut C' and to abut against it, and in order that the face of the nut $n$ shall lie snugly against the under face of clip-bar E, I make such face with the slight upward incline or bevel $h$, as shown.

The parts being thus constructed and put together, the tightening of the bolt K forces its threaded end farther into the nut $n$, which is prevented from turning or from afterward getting loose by reason of its straight side abutting against the straight side of the nut C', so that, in fact, each of these two nuts becomes a locking device for the other, and neither can move; and the tightening of the bolt K will tighten and compress the plug to any degree of adjustment needed to prevent rattling. The cap-piece $j$ prevents the head of the screw from working into and damaging the plug, and its sides or flanges $j'$ clasp and protect the rubber and prevent undue lateral expansion under compression.

As before intimated, the clip-bar or tie may be integral or it may be in two pieces. In the latter case one portion may be made in the usual way, as shown at E, and the projecting or forward part, $f'$, in a separate piece, as shown in Fig. 4, having a screw-threaded hole, by which it may be attached to the clip-iron beneath the tie E, and another hole, $f^2$, to receive the bolt K. This hole $f^2$ may be threaded or not, as preferred. If threaded, the piece $f'$ serves as a two-holed nut. If not threaded, another nut, such as C', will be used.

I claim—

1. The clip-bar or tie F, having a forward projection, $f'$, provided with an open-ended slot, $g$, and with the incline or bevel $h$, adapting the same for the inclined bolt, as shown and described.

2. In combination with a clip-bar having a forward projection, $f'$, inclined on its under face, as shown, the inclined rubber-holding bolt K and its nut $n$, lying, when applied, against the inclined surface of such bar, all substantially as shown, and for the purposes described.

3. In combination, as applied to an ordinary thill-coupler, the slotted and beveled bar F, rubber I, bolt K, nut $n$, and metal cap-piece $j$, provided with the side flanges, $j'$, having the front edges cut away at an incline, as shown, and for the purpose set forth.

4. In a thill-coupling, a nut for the thill-iron clip and a nut for an anti-rattling plug, applied, as shown, in contact with each other, and whereby each nut serves as a locking device for the other, substantially as shown and described.

ALBERT FRENCH.

Witnesses:
GEORGE T. CHAPMAN,
ISAAC WHITEHEAD.